Figure 1:
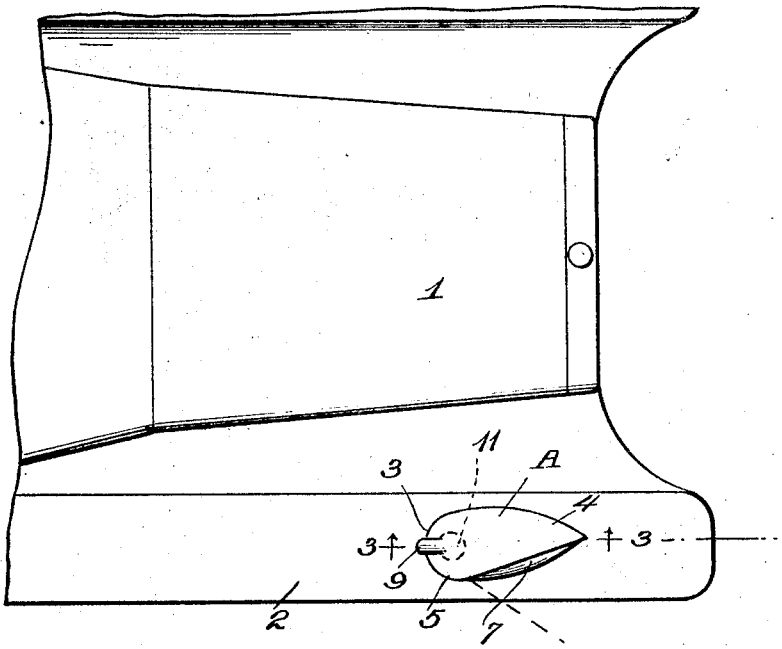

May 11, 1926. 1,584,025

B. G. FREDRICK

RIGHT FENDER SIDE LIGHT

Filed Oct. 25, 1924

Inventor
Bertha G. Fredrick

By Howard L. Fischer
Attorney

Patented May 11, 1926.

1,584,025

UNITED STATES PATENT OFFICE.

BERTHA G. FREDRICK, OF WHITE BEAR LAKE, MINNESOTA.

RIGHT-FENDER SIDE LIGHT.

Application filed October 25, 1924. Serial No. 745,898.

This invention relates to right fender lights for overcoming the present objections of the prior art, where a illumination of the road by the ordinary head lights is more or less ineffective on behalf of the driver of the automobile carrying the lights because the amount of light reflected from the road surface back to the driver's eyes is comparatively small. The greater majority of the rays which strike the road are sent forwardly of the vehicle and do not reflect the rays in the proper manner to protect the driver when passing another vehicle. The lights of approaching vehicles, in a majority of instances, completely blind the driver as to the course of his own machine and often result in serious accidents due to the fact that the drivers either endeavor to pass too wide a margin thereby sending their machines in a ditch which cannot be seen due to the fact that there is not sufficient illumination to the right side of the road, or to the fact that they are afraid to drive over on the side of the road for fear of being ditched, which does not allow sufficient distance for the machines to pass each other and the result being an unavoidable collision.

This invention provides for overcoming these uncertainties in providing a fender light for the right fender of a vehicle which will illuminate the right hand side of the road, whereby the drivers of passing vehicles may be better enabled to observe the exact distance between the machine and the edge of the road. This will allow proper illumination of the right hand side of the road and will thus avoid any possible chance of colliding with another machine when passing the same, as well as eliminating the possible chance of an accident due to running the machine in a ditch. This light being on the right hand front fender also allows the driver to readily observe pedestrians who may be walking along the right side of the roadway.

Another object of this invention is to provide a light upon the right fender of an automobile which is elliptical in construction and is provided with an elliptical reflector having the light source positioned eccentrically thereto, whereby the light is directed on the right side of the roadway and further prevents any of the rays from being projected to the left side of the roadway. The light is secured in a manner to the fender so that the same may be readily adjusted to any desired position to meet the particular circumstances that may arise from time to time.

A further object of this invention is to provide a light for the right fender, the back of which is of a curved or spherical nature, and the left side of the same is projected a substantial distance beyond the right side and curves inwardly toward the right side a sufficient distance to direct the rays of light to the right, the face of the light being in a diagonal plane and into which the lens is secured.

Other objects and advantages of this invention will become apparent during the course of the following description.

Figure 2:
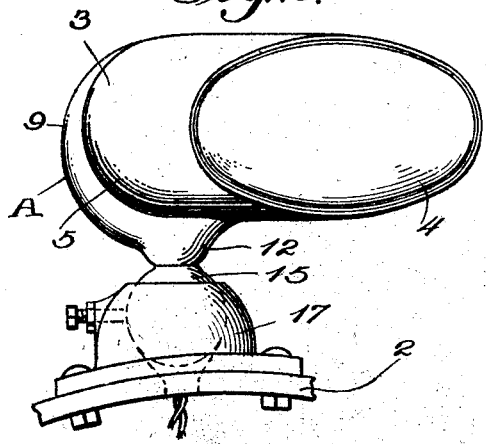
Figure 3:
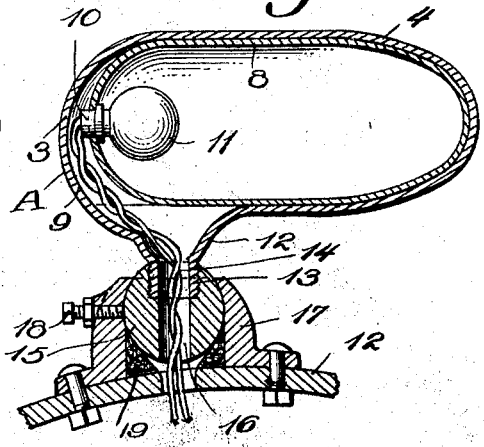
Figure 4:
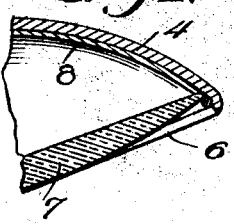

In the accompanying drawing, forming a part of this specification and in which like numerals are employed to designate like parts throughout the same, Figure 1 is a plan view of the light embodying this invention properly positioned upon the right fender of an automobile, a fragmentary portion being shown, Figure 2 is a side elevational view of the same, Figure 3 is a section taken on line 3—3 of Figure 1, showing the means for adjustably securing the light to the right fender, and Figure 4 is a detailed sectional view, showing the lens and means for retaining it within the casing.

Referring to the accompanying drawing, and in particular to Figure 1, a fragmentary view of the front end of an automobile is shown, and is indicated as at 1, provided with the usual fenders 2, the right hand fender being the only one shown for the purpose of the present invention.

The light A is formed with a back 3 which is of a curved or spherical construction and has the left hand side 4 of the same, arcuately projecting beyond the forward end of the right hand side 5 of the light. The side 4 being arcuated, curves inwardly toward the right hand side 5 to a point substantially parallel to the radial line of the light rays, thereby directing the rays of the light to the right hand side of the roadway or vehicle. The face or opening 6 of the light A is provided with a lens 7 which extends in a diagonal plane from the side 4 to the side 5 and is secured therein by any suitable means.

The light A is provided with a reflector 8 which is positioned within and in alinement with the back and sides of the light A.

The reflector, being of spherical shape at its back and elliptical, reflects the rays to the right hand side of the vehicle and roadway and will prevent any of the rays of light from being projected to the left side, thereby eliminating the usual blinding effect of lights upon the approaching vehicle driver.

The light has its back 3 bulged outwardly or enlarged as at 9 to allow for the lamp socket 10 and wiring to be contained within the same so as to prevent the usual rotting of the wires when positioned on the outer surface of the casing. The lamp 11 is positioned eccentrically in the reflector 8 and being so positioned allows the rays to be directed from the elliptical reflector to the right side of the vehicle and roadway. The lamp 11 being so positioned allows the radial line of light rays to become substantially parallel with the side 4 of the light A, thereby preventing any of the rays of light from being projected to the left side and eliminating any possibility of blinding the driver of an approaching vehicle while at the same time affording adequate illumination of the right hand side of the roadway to better enable the driver to gage his distance when passing another vehicle, as well as being able to readily observe pedestrians using the right side of the road.

The bottom of the light A has a projecting neck or flange 12 which is screw threaded as at 13 and provided with an opening 14 whereby the wires may pass therethrough. Secured upon the threaded end of the neck 12 is a ball socket 15 having an orifice 16 therethrough. Securely fastened to the fender 2 and encircling the ball socket 15 is a flange receptacle 17, having a screw 18 for adjustably securing the ball socket 15 within the receptacle 17. A suitable packing 19 is positioned in the bottom of the flanged receptacle 17 to retain the socket 15 in close proximity to the side walls of the receptacle 17 thereby providing a universal effect and adjustment of the light.

It will become apparent to those skilled in the art that this invention presents a decided improvement over the present constructions now in use. It eliminates the usual blinding headlights and provides an adequate illumination of the right hand side of the road. This gives the driver sufficient confidence that he is not going to run into a ditch in going over on the right hand side of the road and at the same time affords a protection for pedestrians which under normal conditions are in danger of being hurt by machines driving too close to them. The improved fender light is stamped from a single piece of sheet material and has the reflector contouring in substantially parallel relation thereto with the lamp mounted within the reflector to direct the rays to the right side of the road. This is accomplished by the construction of the light casing and reflector which has the left hand side projecting beyond the right hand side and curving inwardly toward the right hand side to a point substantially in the axis of the light bulb, thereby directing the rays to the right hand side of the vehicle and roadway.

Having thus described this invention, it is obvious that minor changes may be made in the form and construction of the invention without departing from the material principles thereof. It is not, therefore, desired to confine this invention to the exact form herein shown and described, but it is wished to include all such as properly come within the scope of the appended claims.

What is claimed as new is:

1. A fender light comprising a casing, a lamp within said casing, a reflector having the inner side thereof curving forwardly of and inwardly toward the lamp and terminating in the longitudinal axis of the lamp and having the outer side thereof terminating substantially in the transverse axis of the lamp, said reflector being positioned in said casing and spaced from the rear thereof, an apertured ball to which the casing is attached and a socket for said ball mounted upon the fender whereby a universal motion of said casing is provided and the wires leading to said lamp are concealed in said ball and in back of said reflector.

2. A fender light comprising a casing, a lamp within said casing, a reflector having the inner side thereof curved forwardly of and inwardly toward the lamp and terminating in the longitudinal axis of the lamp and having the outer side thereof terminating substantially in the transverse axis of the lamp, said reflector being positioned in said casing and spaced from the rear thereof and means for supporting said fender light.

BERTHA G. FREDRICK.